United States Patent
Yoon et al.

(10) Patent No.: US 7,937,961 B2
(45) Date of Patent: May 10, 2011

(54) SYSTEM AND METHOD FOR CONTROLLING DEMAND OF MULTI-AIR-CONDITIONER

(75) Inventors: Young-Soo Yoon, Seoul (KR); Sang-Chul Youn, Seoul (KR); Duck-Gu Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 567 days.

(21) Appl. No.: 11/944,326

(22) Filed: Nov. 21, 2007

(65) Prior Publication Data

US 2008/0179410 A1    Jul. 31, 2008

(30) Foreign Application Priority Data

Jan. 26, 2007 (KR) .................. 10-2007-0008574

(51) Int. Cl.
*F25B 7/00* (2006.01)
(52) U.S. Cl. ............... 62/175; 62/230; 236/51; 165/208
(58) Field of Classification Search .................. 62/175, 62/230, 125; 700/276, 291, 295, 296; 236/51, 236/46 R, 1 B; 165/208, 209
See application file for complete search history.

(56) References Cited

U.S. PATENT DOCUMENTS

| | | | | | |
|---|---|---|---|---|---|
| 4,646,528 A | * | 3/1987 | Marcade et al. | ................. | 62/127 |
| 4,830,095 A | * | 5/1989 | Friend | ........................... | 165/208 |
| 5,207,070 A | * | 5/1993 | Miyazaki | ........................ | 62/160 |
| 5,249,432 A | * | 10/1993 | Ichikawa | ........................ | 62/197 |
| 5,303,767 A | * | 4/1994 | Riley | ............................ | 165/208 |
| 5,390,506 A | * | 2/1995 | Sogabe et al. | ................. | 62/175 |
| 5,531,076 A | * | 7/1996 | Pellenz et al. | .................. | 62/184 |
| 5,622,221 A | * | 4/1997 | Genga et al. | .................. | 165/208 |
| 5,682,949 A | * | 11/1997 | Ratcliffe et al. | .............. | 165/209 |
| 5,729,474 A | * | 3/1998 | Hildebrand et al. | .......... | 700/276 |
| 5,743,101 A | * | 4/1998 | Shida et al. | ..................... | 62/175 |
| 6,298,677 B1 | * | 10/2001 | Bujak, Jr. | ........................ | 62/158 |
| 6,510,369 B1 | * | 1/2003 | Lacy | ............................. | 700/295 |
| 6,510,703 B1 | * | 1/2003 | Weng | ............................ | 62/230 |
| 6,539,736 B1 | * | 4/2003 | Isazawa et al. | ................. | 62/175 |
| 6,625,996 B2 | * | 9/2003 | Nakajima et al. | .............. | 62/175 |
| 6,843,066 B2 | * | 1/2005 | Lee et al. | ........................ | 62/175 |
| 6,931,872 B2 | * | 8/2005 | Kaga et al. | .................. | 62/228.4 |
| 6,956,500 B1 | * | 10/2005 | Ducharme et al. | ........ | 340/870.02 |
| 7,062,927 B2 | * | 6/2006 | Kwon et al. | .................... | 62/126 |
| 7,472,558 B1 | * | 1/2009 | Narita | ............................. | 62/175 |
| 2003/0079483 A1 | * | 5/2003 | Komatsu et al. | ................ | 62/148 |
| 2004/0107717 A1 | * | 6/2004 | Yoon et al. | ....................... | 62/230 |
| 2005/0076659 A1 | * | 4/2005 | Wallace et al. | ................. | 62/157 |
| 2005/0091998 A1 | * | 5/2005 | Cho et al. | ........................ | 62/175 |
| 2005/0204758 A1 | * | 9/2005 | Kwon et al. | .................... | 62/175 |
| 2006/0080980 A1 | * | 4/2006 | Lee et al. | ........................ | 62/157 |
| 2006/0130496 A1 | * | 6/2006 | Chapman et al. | .............. | 62/126 |
| 2006/0191275 A1 | * | 8/2006 | Jung et al. | .................. | 62/228.1 |
| 2008/0098753 A1 | * | 5/2008 | Allison et al. | ..................... | 62/66 |
| 2008/0178615 A1 | * | 7/2008 | Yoon et al. | ........................ | 62/79 |
| 2010/0010679 A1 | * | 1/2010 | Kassel | ........................... | 700/278 |

* cited by examiner

FOREIGN PATENT DOCUMENTS

JP        2006-29693 A    2/2006

*Primary Examiner* — George Nguyen
(74) *Attorney, Agent, or Firm* — Birch, Stewart, Kolasch & Birch, LLP

(57) ABSTRACT

A system for controlling multiple air conditioners. The system includes a demand control unit configured to calculate an estimated power amount to be used by the multiple air conditioners based on an amount of power consumed by the multiple air conditioners during a predetermined time period, and to forcibly control an operation rate of one or more air conditioners based on a priority level assigned to the one or more air conditioners.

20 Claims, 2 Drawing Sheets

SYSTEM AND METHOD FOR CONTROLLING DEMAND OF MULTI-AIR-CONDITIONER

CROSS-REFERENCE TO RELATED APPLICATIONS

This application claims priority to Korean Application No. 10-2007-0008574, filed in Korea on Jan. 26, 2007, the entire contents of which is also hereby incorporated in its entirety.

BACKGROUND OF THE INVENTION

1. Field of the Invention

The present invention relates to a system and method for controlling multiple air conditioners.

2. Description of the Related Art

An air conditioner system that is placed in a large office building generally includes multiple air conditioners throughout the building. The air conditioners are controlled to operate within a predetermined temperature. That is, when the temperature of a room is within an allowable range, the air conditioner is turned off. When the temperature of the room is not within an allowable range, the corresponding air conditioner is turned on. However, the related art control system does not take into account an individual's comfort.

Therefore, the related art air conditioner control system merely controls the multiple air conditioners in a constrained or limited manner without considering the comfort of individuals within the building.

SUMMARY OF THE INVENTION

Accordingly, one object of the present invention is to address the above-noted and other problems.

Another object of the present invention is to provide a system and method for controlling multiple air conditioners in a balanced manner and so the air conditioners stay within an allowable power amount.

Another object of the present invention is to provide a method and system for controlling multiple air conditioners in a prioritized manner.

To achieve these and other advantages and in accordance with the purpose of the present invention, as embodied and broadly described herein, the present invention provides in one aspect a system for controlling multiple air conditioners. The system includes a demand control unit configured to calculate an estimated power amount to be used by the multiple air conditioners based on an amount of power consumed by the multiple air conditioners during a predetermined time period, and to forcibly control an operation rate of one or more air conditioners based on a priority level assigned to the one or more air conditioners.

In another aspect, the present invention provides a method for controlling multiple air conditioners. The method includes calculating an estimated power amount to be used by the multiple air conditioners based on an amount of power consumed by the multiple air conditioners during a predetermined time period, and forcibly controlling an operation rate of one or more air conditioners based on a priority level assigned to one or more air conditioners.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
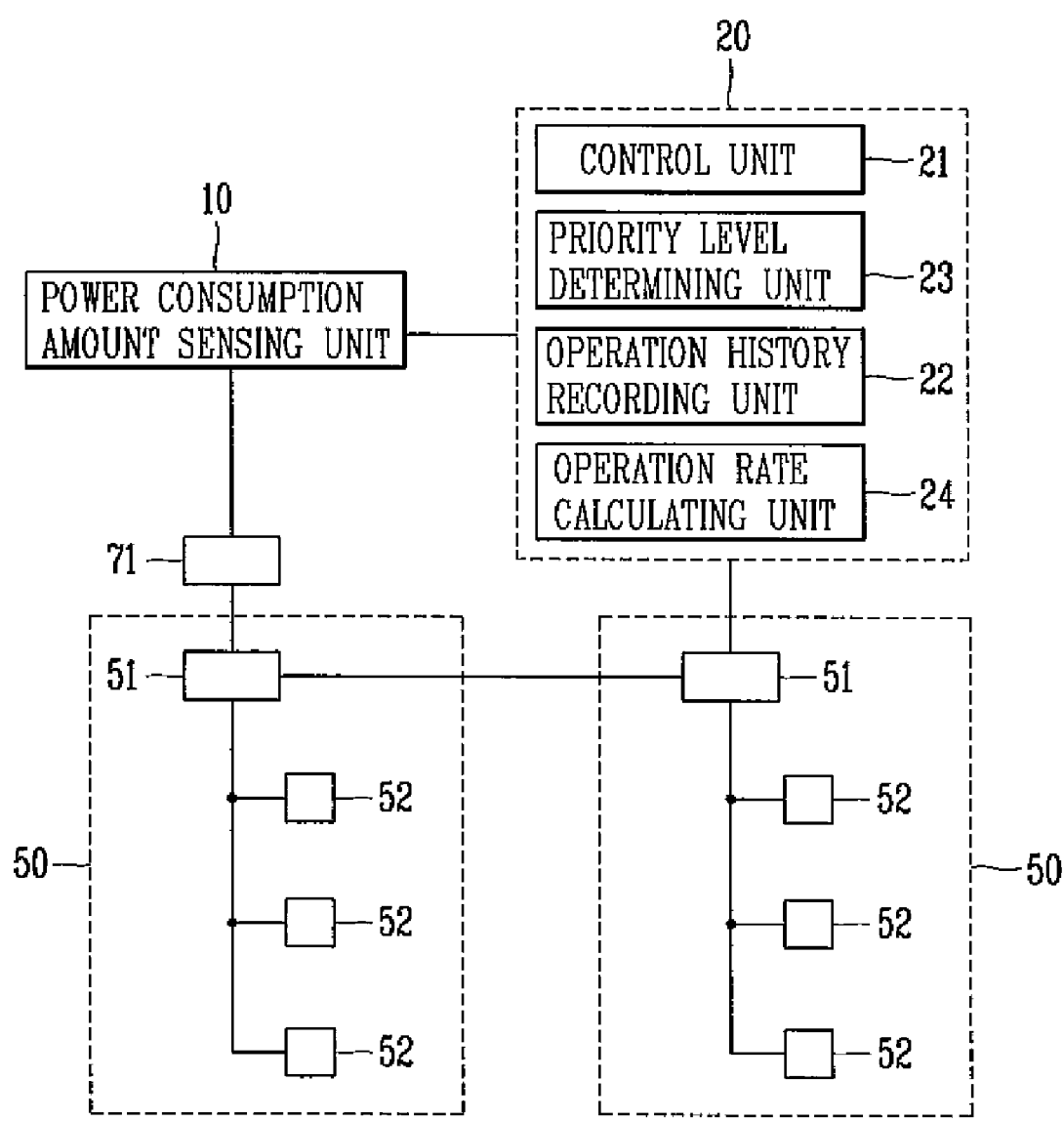
FIG. 1 is a block diagram of a system for controlling multiple air conditioners according to an embodiment of the present invention.

FIG. 1 is a block diagram illustrating a system for controlling multiple air conditioners according to an embodiment of the present invention. As shown in FIG. 1, the system includes a power consumption amount sensing unit 10, a demand control unit 20, a power detecting unit (watt-hr meter) 71 and multiple air conditioners 50. Further, as shown, the multiple air conditioners 50 include at least one outdoor unit 51 and multiple indoor units 52.

The power consumption amount sensing unit 10 detects an amount of power consumed during a predetermined time period by the multiple air conditioners 50 installed in each area of a building. In more detail, the watt-hour meter 71 is connected to the multiple air conditioners 50 and monitors the amount of power used by the multiple air conditioners 50. The power consumption unit 10 then uses this information to determine the amount power used by the air conditioners 50 during a predetermined amount of time.

The demand control unit 20 then calculates an estimated power amount used by the multiple air conditioners 50 based on the power consumption amount sensed by the power consumption sensing unit 10. Further, the control unit 20 forcibly controls an operation of one or more air conditioners according to the calculated estimated power amount. For example, the control unit 20 may forcibly control the air conditioners in a sequential manner, in a prioritized manner, or in a manner that is predetermined by a manager or other user. The operating history of the air conditioners 50 may also be examined when controlling the multiple air conditioners. Thus, the air conditioners 50 may be selectively controlled in accordance with a comfort level of individuals within the building. The amount of power used by the air conditioners 50 may also be controlled to be within a certain allowable limit.

In more detail, the demand control unit 20 receives data with respect to the detected power consumption amount, estimates a power consumption amount consumed by the multiple air conditioners 50, determines whether the estimated power amount exceeds a pre-set demand power amount, and forcibly controls the air conditioners 50 such that the amount of power used by the air conditioners 50 is maintained within the pre-set demand power amount.

As shown in FIG. 1, the demand control unit 20 includes a control unit 21, an operation history recording unit 22, a priority level determining unit 23, and an operation rate calculating unit 24. The operation rate calculating unit 24 compares the estimated power amount with the pre-set target power amount, and calculates an overall operation rate of the air conditioners 50 based on the comparison result such that the power consumed by the multiple air conditioners falls below the pre-set target amount.

For example, the operating rate calculating unit 24 may determine that any number of air conditioners 50 must be turned off to reduce the amount of power consumed by all of the multiple air conditioners. The operating rate calculating unit 24 may also determine that an operating mode any number of air conditioners 50 needs to be changed to reduce the overall amount of power consumed. For example, the operation mode an air conditioner may be changed into a fan mode only, the mode may be changed from high to low (or medium), the circulation amount of refrigerant may be decreased, etc.

Further, the recording unit 22 records an operation history of the multiple air conditioners 50, and the priority level determining unit 23 determines a priority level with respect to one or more air conditioners 50 according to the calculated operation rate and the recorded operation history of the air conditioners. In more detail, the priority level determining unit 23 sets a priority level of each (or at least one) air conditioner 50 according to the information recorded in the history recording unit 22, such that a highest priority level is set to the air conditioner(s) that was most recently controlled or to the air conditioner(s) that was controlled most-often. Also, the priority levels may be set in gradually lower levels for each (or at least one) air conditioner 50 according to their respective operation history.

In addition, the control unit 21 forcibly controls an operation of the multiple air conditioners 50 according to each set priority level. Namely, the control unit 21 sequentially selects and controls the multiple air conditioners 50 starting from the air conditioner with the lowest priority level. Accordingly, an air conditioner 50 which has been frequently forcibly controlled is excluded from the forcible controlling target or is forcibly controlled last. Similarly, an air conditioner 50 that has been mostly recently forcibly controlled is also excluded from the forcible controlling target or is forcibly controlled last. Therefore, the multiple air conditioners 50 are controlled in a balanced manner.

A method for controlling according to an embodiment of the present invention will now be described with reference to FIG. 2. FIG. 1 will also be referred to in this description.

First, while the multiple air conditioners 50 in the building are operated, the power consumption amount sensing unit 10 senses a power consumption amount based on an amount of power measured by the watt-hour meter 71, and transmits information on the sensed power consumption amount to the demand control unit 20. Then, the demand control unit 20 calculates an estimated power amount based on the power consumption amount sensed by the power consumption amount sensing unit 10 and compares the calculated estimated power amount with a pre-set target power amount (S1).

If the estimated power amount exceeds the target power amount (Yes in S1), the operation rate calculating unit 24 sets an overall operation rate of the multiple air conditioners 50 such that the estimated power amount is smaller than the target power amount (S2). Next, the demand control unit 20 determines if a currently selected air conditioner 50 is being forcibly controlled (S3). If the demand control unit 20 determines the currently selected air conditioner 50 is being forcibly controlled (Yes in S3), the demand control unit 20 returns the air conditioner 50 to its original operation rate (S7), and the control history of the air conditioner 50 is updated in the operation history recording unit 22 (S8).

In addition, after step S8 or when the demand control unit 20 determines the currently selected air conditioner 50 is not being forcibly controlled (No in S3), the priority level determining unit 23 determines a priority level for a next air conditioner according to the operation history and the operation rate recorded in the operation history recording unit 22. That is, the priority level determining unit 23 assigns a recently controlled air conditioner 50 or an air conditioner 50 that has been forcibly controlled a large number of times in a predetermined period to have a higher priority. In addition, air conditioners with a lower priority are forcibly controlled before air conditioners with a higher priority.

Thereafter, the control unit 21 selects one or more air conditioners 50 according to each priority level set by the priority level determining unit 23 (S4). Then, the selected air conditioner 50 is forcibly controlled according to the set operation rate (S5), and the operation history of the controlled air conditioner 50 is recorded in the operation history recording unit 22 (S6).

Figure 2:
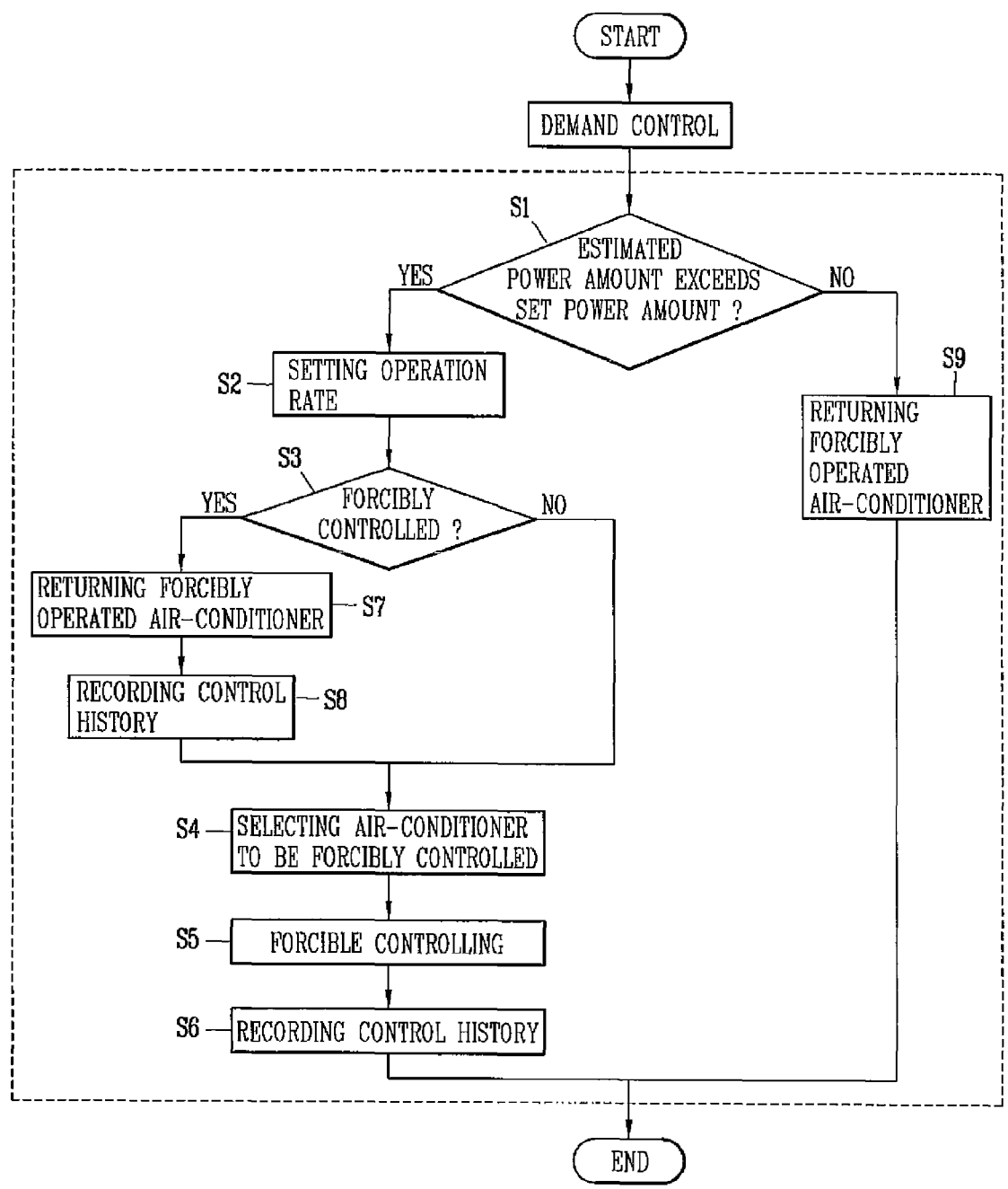
FIG. 2 is a flowchart illustrating a method for controlling multiple air conditioners according to an embodiment of the present invention.

In addition, as shown in FIG. 2, when the estimated power amount does not exceed the target power amount (No in S1), the control unit 21 returns any forcibly controlled air conditioners 50 to their original operation state (S9). Further, the air conditioners 50 are forcibly controlled by turning off the indoor units 52 to stop air conditioning in the area where the indoor units 52 are installed. Alternatively, the outdoor units 51 can be turned off to convert an operation mode of the corresponding air conditioner 50 to thus reduce the power consumption amount of the air conditioner.

It is also possible to forcibly control the multiple air conditioners 50 by changing an operation mode of an air conditioner 50. That is, the operation mode of the air conditioner is changed into an operation mode that uses less power. For example, an operation mode of an air conditioner 50 may be changed into a dehumidification mode, the blowing amount or strength may be reduced (e.g., from high to low), the circulation speed of a refrigerant may be changed, etc.

An example of controlling multiple air conditioners according to the present invention will now be described. In this example, it is assumed there are ten indoor units in a building and that the amount of consumed power exceeds the pre-set amount by 20%. Thus, in this example, the operation rate calculating unit 24 determines the consumed power should be reduced by 20% and determines the number of air conditioners to be forcibly controlled (e.g., turned off) is two air conditioners (i.e., 20% of the ten air conditioners operating in the building). The demand control unit 20 then controls an air conditioner having a lowest priority. As discussed above, the priority levels of the air conditioners are assigned based on the recorded control history such that an air conditioner which has not been recently controlled or that has not been controlled a large number of times in a predetermined amount of time is forcibly controlled first. Thus, the operating history of the air conditioners is taking into consideration when assigning the priority levels of the multiple air conditioners.

Further, rather than selecting two air conditioners, the operating rate calculating unit 24 may determined to change an operation mode of one or more air conditioners to reduce the total amount of power consumed by the multiple air conditioners to be less than the pre-set target amount. For example, an operation mode of four of the ten air conditioners may be changed into an air blowing mode only (by turning off the corresponding outdoor units) to reduce the overall power consumption amount by 20%.

As so far described, the system and method for controlling multiple air conditioners according to an embodiment of the present invention has several advantages.

That is, an operation rate of an air conditioner is calculated by comparing the estimated power amount and the target power amount. Further, the operation history of the forcibly controlled air conditioner is recorded, and a priority level of air conditioners is determined according to the recorded control history and the operation rate. Then, the multiple air conditioners are forcibly controlled according to each determined priority level in a sequential manner. Therefore, a particular air conditioner is not lopsidedly or partially controlled, which improves the comfort of users using the multiple air conditioners. That is, the air conditioners are controlled in a balanced manner.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A system for controlling multiple air conditioners, the system comprising:
   a demand control unit configured to calculate an estimated power amount to be used by the multiple air conditioners based on an amount of power consumed by the multiple air conditioners during a predetermined time period, and to forcibly control an operation rate of one or more air conditioners based on a priority level assigned to each of the one or more air conditioners,
   wherein the demand unit includes:
   an operation rate calculating unit configured to compare the estimated power amount and a pre-set target power amount and to calculate an overall operation rate of the multiple air conditioners based on the comparison result;
   an operation history recording unit configured to record a forcibly control history of the multiple air conditioners; and
   a priority level determining unit configured to assign priority levels to the multiple air conditioners based on the calculated overall operation rate and the recorded forcibly control history of the multiple air conditioners.

2. The system of claim 1, wherein the demand control unit comprises:
   a control unit configured to forcibly control an operation of the multiple air conditioners based on the priority levels assigned by the priority level determining unit.

3. The system of claim 1, further comprising:
   a power consumption detecting unit configured to detect the amount of power consumed by the multiple air conditioners during the predetermined time period.

4. The system of claim 2, wherein the priority level determining unit assigns a higher priority level to a first air conditioner that has been forcibly controlled more recently or more often than a second air conditioner such that the control unit forcibly controls the second air conditioner before the first air conditioner.

5. The system of claim 2, wherein the control unit forcibly controls the operation of a respective air conditioner by turning off at least one of an outdoor unit and indoor unit of the respective air conditioner.

6. The system of claim 2, wherein the control unit forcibly controls the operation of a respective air conditioner by changing an operation mode of the respective air conditioner.

7. The system of claim 2, wherein the overall operation rate of the multiple air conditioners corresponds to a number of air conditioners to forcibly control or an operation mode of air conditioners to forcibly control.

8. The system of claim 2, wherein the operation history recording unit records how many times a respective air conditioner has been forcibly controlled in a predetermined amount of time.

9. The system of claim 2, wherein the control unit forcibly controls the operation of the multiple air conditioners based on the assigned priority levels when the operation rate calculating unit determines the estimated power amount is greater than the pre-set target power amount.

10. The system of claim 9, wherein the control unit returns any forcibly controlled air conditioners to their initial operation mode when the operating rate calculating unit determines the estimated power amount is less than the pre-set target power amount.

11. A method for controlling multiple air conditioners, the method comprising:
    calculating an estimated power amount to be used by the multiple air conditioners based on an amount of power consumed by the multiple air conditioners during a predetermined time period;
    comparing the estimated power amount and a pre-set target power amount;
    calculating an overall operation rate of the multiple air conditioners based on the comparison result;
    recording a forcibly control history of the multiple air conditioners;
    assigning priority levels to the multiple air conditioners based on the calculated operation rate and the recorded forcibly control history of the multiple air conditioners; and
    forcibly controlling an operation rate of one or more air conditioners based on a priority level assigned to one or more air conditioners.

12. The method of claim 11, further comprising:
    forcibly controlling an operation of the multiple air conditioners based on the assigned priority levels.

13. The method of claim 11, further comprising:
    detecting the amount of power consumed by the multiple air conditioners during the predetermined time period.

14. The method of claim 12, wherein the assigning step assigns a higher priority level to a first air conditioner that has been forcibly controlled more recently or more often than a second air conditioner such that the forcibly controlling step controls the second air conditioner before the first air conditioner.

15. The method of claim 12, wherein the forcibly controlling step controls the operation of a respective air conditioner by turning off at least one of an outdoor unit and indoor unit of the respective air conditioner.

16. The method of claim 12, wherein the forcibly controlling step controls the operation of a respective air conditioner by changing an operation mode of the respective air conditioner.

17. The method of claim 12, wherein the overall operation rate of the multiple air conditioners corresponds to a number of air conditioners to forcibly control or an operation mode of air conditioners to forcibly control.

18. The method of claim 12, wherein the recording step records how many times a respective air conditioner has been forcibly controlled in a predetermined amount of time.

19. The method of claim 12, wherein the forcibly controlling step controls the operation of the multiple air conditioners based on the assigned priority levels when the comparing step determines the estimated power amount is greater than the pre-set target power amount.

20. The method of claim 19, wherein the forcibly controlling step returns any forcibly controlled air conditioners to their initial operation mode when the operating rate calculating unit determines the estimated power amount is less than the pre-set target power amount.

* * * * *